(12) United States Patent
Wang

(10) Patent No.: US 10,982,050 B2
(45) Date of Patent: Apr. 20, 2021

(54) SEALING COMPOSITE MATERIAL, PREPARATION METHOD, AND APPLICATION THEREOF

(71) Applicant: Wuhan China Star Optoelectronics Semiconductor Display Technology Co., Ltd., Wuhan (CN)

(72) Inventor: Yamin Wang, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/607,105

(22) PCT Filed: May 13, 2019

(86) PCT No.: PCT/CN2019/086522
§ 371 (c)(1),
(2) Date: Oct. 22, 2019

(87) PCT Pub. No.: WO2020/215390
PCT Pub. Date: Oct. 29, 2020

(65) Prior Publication Data
US 2020/0339756 A1    Oct. 29, 2020

(30) Foreign Application Priority Data
Apr. 25, 2019    (CN) .......................... 201910337567.0

(51) Int. Cl.
*C08G 77/06*    (2006.01)
*C08G 77/392*    (2006.01)
*C08L 83/08*    (2006.01)
*C08G 77/388*    (2006.01)

(52) U.S. Cl.
CPC ........... *C08G 77/06* (2013.01); *C08G 77/388* (2013.01); *C08G 77/392* (2013.01); *C08L 83/08* (2013.01); *C08L 2201/08* (2013.01); *C08L 2205/025* (2013.01)

(58) Field of Classification Search
None
See application file for complete search history.

(56) References Cited

U.S. PATENT DOCUMENTS
2015/0361224 A1* 12/2015 Weiss ................... C08G 77/388
                                                    514/772.3

FOREIGN PATENT DOCUMENTS
WO    WO-2013072155 A2 *  5/2013  ............... A61Q 5/02
WO    WO-2014047833 A1 *  4/2014  ........... D06M 13/184

* cited by examiner

*Primary Examiner* — Nicole M. Buie-Hatcher

(57) ABSTRACT

A sealing composite includes a molecular formula as follows:

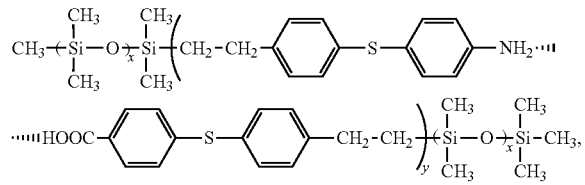

and a ratio of x to y ranges from 0.25 to 0. A sealing composite material having a self-healing property is achieved by introducing a hydrogen bond between an amine group and a carboxylic acid group.

10 Claims, 1 Drawing Sheet

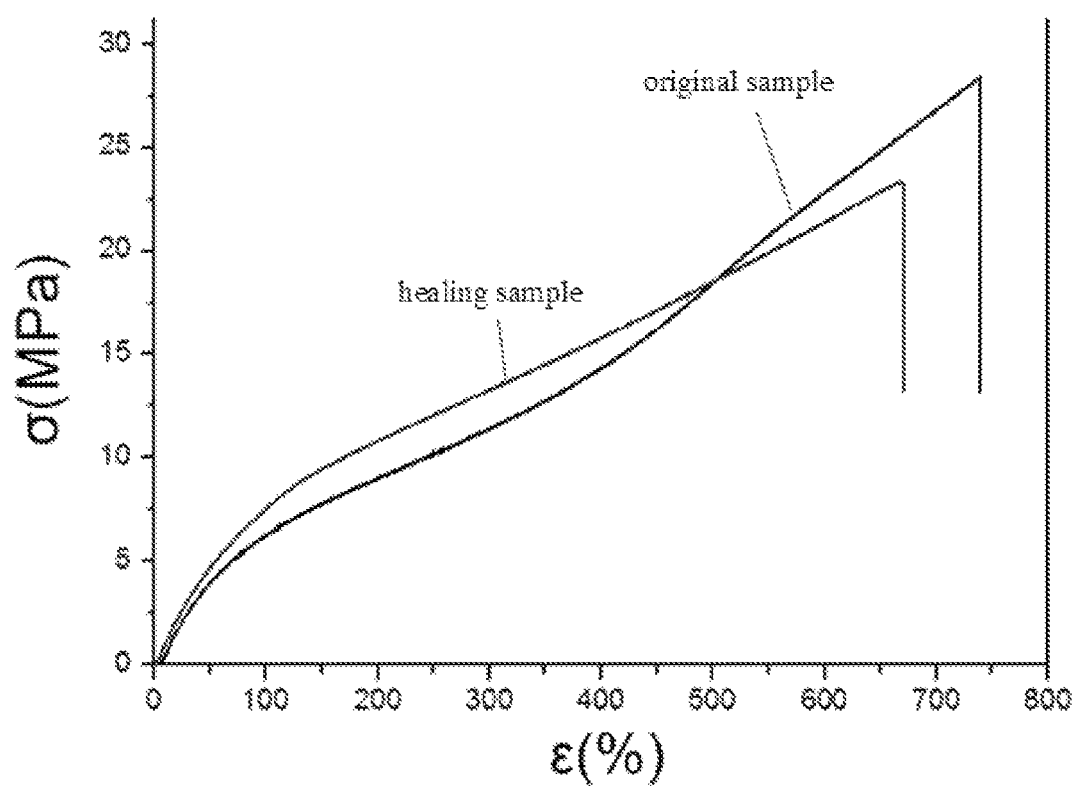

SEALING COMPOSITE MATERIAL, PREPARATION METHOD, AND APPLICATION THEREOF

RELATED APPLICATIONS

This application is a National Phase of PCT Patent Application No. PCT/CN2019/086522 having International filing date of May 13, 2019, which claims the benefit of Chinese Patent Application No. 201910337567.0 filed on Apr. 25, 2019. The contents of the above applications are all incorporated by reference as if fully set forth herein in their entirety.

FIELD AND BACKGROUND OF THE INVENTION

The present invention relates to a field of sealing materials for equipment operated at high temperatures.

It is known that industrialization processes are processes in which equipment replaces manual labor to achieve mass production. Among them, sealing rings are used in the equipment to ensure the processes are normally operated. In chemical engineering, equipment needs to use sealing rings to make sure reaction can be performed.

For example, a cross-linking reaction for polymers is carried out in an oxygen-free environment, so high demands on a closed reaction environment are required. As for some high demanding environments, such as high temperature, high pressure, vacuum, and oxygen-free environment, the local environment under certain conditions is crucial, which in turn makes the sealing ring more prominent. Therefore, the sealing ring can achieve an excellent sealing effect to meet reaction requirements.

The sealing rings are commonly are made of high molecular materials, and more particularly, high molecular elastomer materials are suitable. Such materials are widely used because of their high elastic properties, which make them more durable to high-temperature environments.

In addition, the high-temperature environment also damages high elastic materials, and thus the sealing rings must be replaced periodically to ensure normal effective use. It is not a problem to replace the seal rings during the maintenance of the equipment. However, if the seal rings are damaged due to extremely using the seal rings during operating, it will inevitably cause damage to the normal production in the equipment. It is especially serious for high temperature barrier anaerobic equipment because the damage of seal rings has a great influence on oxygen-free resistance.

Therefore, it is necessary to develop a new sealing ring to overcome the drawbacks in the prior art.

SUMMARY OF THE INVENTION

A sealing composite includes a molecular formula as follows:

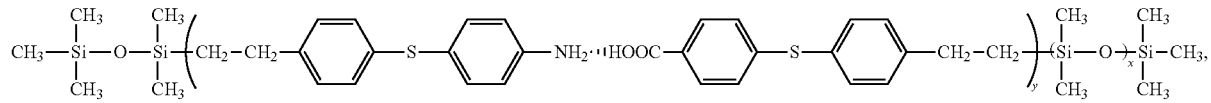

and a ratio of x to y ranges from 0.25 to 0.

In one embodiment, a connection between a $NH_2$ bond and a HOOC bond in the molecular formula is a hydrogen bond, and the hydrogen bond is a noncovalent bond.

In one embodiment, the sealing composite is prepared by a raw material, and the raw material includes a first polymer and a second polymer, the first polymer is vinyl terminated siloxane-g-p-aminothiophenol and the second polymer is vinyl terminated siloxane-g-p-mercaptobenzoic acid, and the first polymer has a molecular formula as follows:

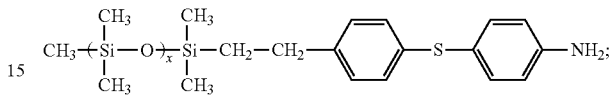

and the second polymer has a molecular formula as follows:

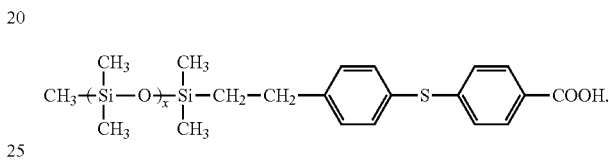

In one embodiment, a molar ratio of the first polymer to the second polymer ranges from 0.2 to 5.

In one embodiment, the first polymer is prepared by a raw material, and the raw material comprises a compound A and a compound C, and the compound A is p-aminothiophenol and the compound C is vinyl terminated siloxane. The compound A has a molecular formula as follows:

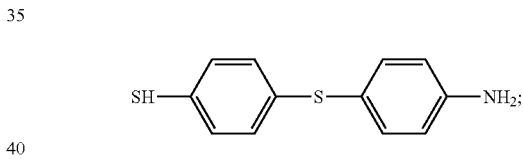

the compound C has a molecular formula as follows:

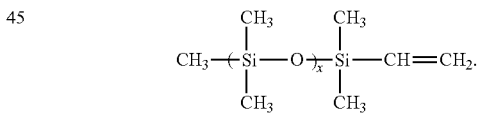

In one embodiment, a molar ratio of the compound C to the compound A ranges from 0.25 to 4.

In one embodiment, the second polymer is prepared by a raw material, and the raw material includes a compound B and a compound C, and the compound B is p-mercaptobenzoic acid and the compound C is vinyl terminated siloxane. The compound B has a molecular formula as follows:

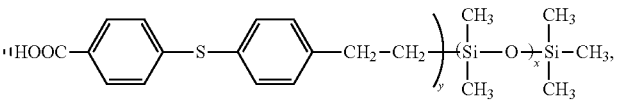

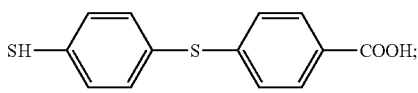 [SMILES: O=C(O)c1ccc(Sc2ccc(S)cc2)cc1]

and the compound C has a molecular formula as follows:

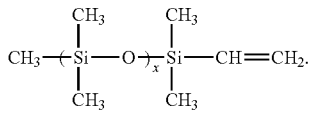

In one embodiment, a molar ratio of the compound C to the compound B ranges from 0.25 to 4.

In another embodiment, a preparation method for the sealing composite includes following steps:

dissolving a first polymer and a second polymer in tetrahydrofuran to obtain a mixture solution and stirring the mixture solution at 20 to 40° C. for 24 to 96 hours;

drying the mixture solution in a vacuum environment at 40 to 80° C. for 10 to 25 minutes to obtain a remaining mixture solution; and coating the remaining mixture solution on a glass substrate and drying in a vacuum environment at 40 to 60° C. to obtain the sealing composite.

The sealing composite is prepared by a raw material, and the raw material comprises a first polymer and a second polymer, the first polymer is vinyl terminated siloxane-g-p-aminothiophenol and the second polymer is vinyl terminated siloxane-g-p-mercaptobenzoic acid. The sealing composite material is formed by the first polymer and the second polymer through a polymerization reaction at normal temperature.

In one embodiment, a molar ratio of the first polymer to the second polymer ranges from 0.2 to 5.

Furthermore, a preparation method for the first polymer is described as follows:

dissolving the compound C in tetrahydrofuran and stirring for 9-24 hours to obtain a first mixture solution;

dissolving the 2-aminoethanethiol solution in tetrahydrofuran/ethanol and stirring at room temperature for 6 to 10 hours to obtain a second mixture solution;

adding the second mixture solution to the first mixture solution to obtain a third mixture solution;

adding 2,2-dimethylolpropionic acid to the third mixture solution, and then adding the compound A, and a molar ratio of the compound C to the compound A ranging from 0.25 to 4, and stirring the mixture solution again for 10 to 15 hours to get a grafted product; and washing the precipitates with methanol at room temperature and drying the precipitates in a vacuum environment at 40 to 80° C. for 24 to 96 hours to obtain a dried first polymer.

The first polymer has a molecular formula as follows:

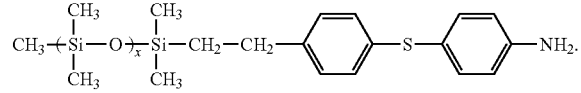

Furthermore, a preparation method for the second polymer is described as follows:

dissolving the compound C in tetrahydrofuran and stirred for 9-24 hours to obtain a first mixture solution;

dissolving the 2-aminoethanethiol solution in tetrahydrofuran/ethanol and stirring at room temperature for 6 to 10 hours to obtain a second mixture solution;

adding the second mixture solution to the first mixture solution to obtain a third mixture solution;

adding 2,2-dimethylolpropionic acid to the third mixture solution, and then adding the compound B, and a molar ratio of the compound C to the compound A ranging from 0.25 to 4, and stirring the mixture solution again for 10 to 15 hours to get a grafted product; and washing the precipitates with methanol at room temperature and drying the precipitates in a vacuum environment at 40 to 80° C. for 24 to 96 hours to obtain a dried second polymer.

The second polymer has a molecular formula as follows:

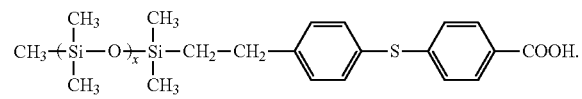

Furthermore, a sealing ring includes the sealing composite according one embodiment of the present invention.

The present invention relates to a sealing composite material, which has a self-healing property, which is obtained by introducing a hydrogen bond between an amine group and a carboxylic acid group, and an elasticity property, which is obtained by introducing polymethylsiloxane. Therefore, a self-healing sealing ring material is achieved.

Currently, neither a silicone rubber elastomer having a sealing property nor a self-healing sealing ring material is disclosed. It is believed that there will be more studies in the future. This disclosure provides a novel idea and a partial solution in the art Further, the sealing composite material can be widely applied to equipment, which is operated at a high temperature environment and required for sealing, for example, but is not limited to, PI OVEN equipment used for manufacturing an organic light emitting diode (OLED) panel. The sealing composite material not only effectively seals the device but also achieves self-healing when it is damaged, and thus it has a broad application and market prospects.

BRIEF DESCRIPTION OF THE SEVERAL VIEWS OF THE DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled persons in the art based on these drawings without paying any creative effort.

The FIGURE is a stress-strain curve of a tensile test for a test specimen composed of the sealing composite material after being healed according to one embodiment of the present invention.

DETAILED DESCRIPTION OF SPECIFIC EMBODIMENTS OF THE INVENTION

Hereinafter, a sealing composite, a preparation method, and technical solutions applied to the present invention will be further described in detail with reference to the accompanying drawings and embodiments.

A sealing composite material having a self-healing property is achieved by introducing a hydrogen bond between an amine group and a carboxylic acid group. The sealing composite has a molecular formula as follows:

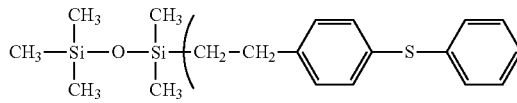

and a ratio of x to y ranges from 0.25 to 0. A connection between a NH2 bond and a HOOC bond in the molecular formula is a hydrogen bond, and the hydrogen bond is a noncovalent bond.

Moreover, a preparation method for the sealing composite includes preparing steps for a first polymer, a second polymer, and a target product. The first polymer is vinyl terminated siloxane-g-p-aminothiophenol and the second polymer is vinyl terminated siloxane-g-p-mercaptobenzoic acid.

In other embodiments, the first polymer and the second polymer may also be provided directly in accordance with the teachings of the present invention without the need for separate preparation. However, in order to disclose the preparation process of the target product in detail, the preparation process of the first polymer and the second polymer will be exemplified below.

The first polymer is prepared by a raw material, and the raw material includes p-aminothiophenol (referred to as compound A) and vinyl terminated siloxane (referred to as compound C).

The compound A has a molecular formula as follows:

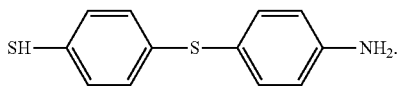 [SMILES: Nc1ccc(Sc2ccc(S)cc2)cc1]

Preferably, the compound C has a molecular formula as follows:

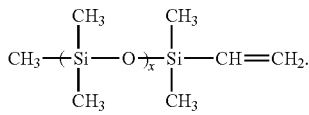

Furthermore, a preparation method for the first polymer is described as follows:

adding the compound C (0.5-30 mmol) to a round bottom flask, and then adding enough tetrahydrofuran (100 mL) and stirring for 9-24 hours to obtain a first mixture solution;

dissolving the 2-aminoethanethiol solution (20 mL-160 mL) in tetrahydrofuran/ethanol (v/v=10:1)(5 mL-40 mL) and stirring at room temperature for 6 to 10 hours to obtain a second mixture solution, and a volume ratio of the tetrahydrofuran/ethanol mixture solution to the 2-aminoethanethiol solution being preferably 1:4;

adding the second mixture solution to the first mixture solution to obtain a third mixture solution;

adding 2,2-dimethylolpropionic acid (0.5-30 mmol) to the third mixture solution, and then adding the compound A, and a molar ratio of the compound C to the compound A ranging from 0.25 to 4, and stirring the mixture solution again for 12 hours to get a grafted product; and washing the precipitates with methanol at room temperature and drying the precipitates in a vacuum environment, for example, at 40 to 80° C. for 24 to 96 hours to obtain a dried first polymer.

The first polymer has a molecular formula as follows:

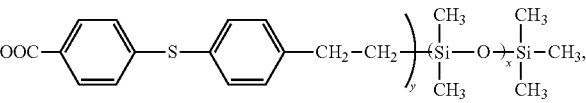

Furthermore, the second polymer is prepared by a raw material, the raw material includes compound B and compound C. The compound B is p-aminothiophenol and the compound C is vinyl terminated siloxane.

Preferably, the compound B has a molecular formula as follows:

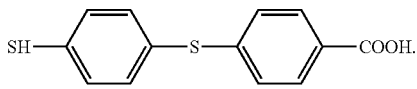

Preferably, the compound C has a molecular formula as follows:

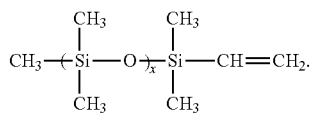

Furthermore, a preparation method for the second polymer is described as follows:

adding the compound C (0.5-30 mmol) to a round bottom flask, and then adding enough tetrahydrofuran (100 mL) and stirring for 9-24 hours to obtain a first mixture solution;

dissolving the 2-aminoethanethiol solution (20 mL-160 mL) in tetrahydrofuran/ethanol (v/v=10:1)(5 mL-40 mL) and stirring at room temperature for 6 to 10 hours to obtain a second mixture solution, and a volume ratio of the tetrahydrofuran/ethanol mixture solution to the 2-aminoethanethiol solution being preferably 1:4;

adding the second mixture solution to the first mixture solution to obtain a third mixture solution;

adding 2,2-dimethylolpropionic acid (0.5-30 mmol) to the third mixture solution, and then adding the compound B, and a molar ratio of the compound C to the compound B ranging from 0.25 to 4, and stirring the mixture solution again for 12 hours to get a grafted product; and washing the precipitates with methanol at room temperature and drying the precipitates in a vacuum environment, for example, at 40 to 80° C. for 24 to 96 hours to obtain a dried second polymer.

The second polymer has a molecular formula as follows:

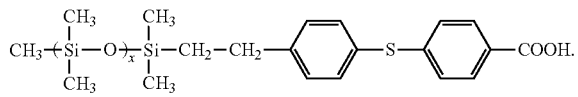

Furthermore, a preparation method for the target product is described as follows:

dissolving the first polymer and the second polymer in 100 mL tetrahydrofuran to obtain a mixture solution, and a molar ratio of the first polymer to the second polymer ranging from 0.2-5;

stirring the mixture solution at 20 to 40° C. for 24 to 96 hours and drying the mixture solution in a vacuum environment, for example, at 40 to 80° C. to volatilize a part of the solvent in the mixture solution for 10 to 25 minutes;

coating the remaining mixture solution on a glass substrate and drying in a vacuum environment at 40 to 60° C. to obtain the target product.

Furthermore, a sealing ring includes the sealing composite according one embodiment of the present invention.

The sealing composite is applied to a tensile strength test. Two samples are taken, and one of the samples is scratched by a scalpel and has a mark of length of 20 mm and a depth of 5 mm, and healing the scratched sample. The scratched sample is referred to as healing sample. For example, the scratched sample is healed, but not limited to, in the OVEN cavity at 450° C. environment for 1 hour, and the other sample is maintained without any treatment, which is referred to as original sample. Then, the healing sample and the original sample are applied to a tensile strength test, respectively. The tensile speed of the tensile test is 12.5 mm/s, but is not limited thereto. A stress-strain curve of a tensile test for the healing sample and the original sample is shown in the FIGURE.

Referring to the FIGURE, the maximum stress of the original sample and the healing sample corresponding to the maximum ordinate value is described as follows:

$$\delta_{max-orign}=28.42 \text{ MPa}; \delta_{max-heal}=23.3 \text{ MPa}.$$

The maximum elongation at break of the two sample is described as follows:

$$\varepsilon_{max-orign}=745\%; \varepsilon_{max-heal}=675\%:$$

Accordingly, the repair efficiency of the maximum break stress of the healing sample is 23.3/28.42=82.04%, that is, the ratio of the maximum stress of the two sample is multiplied by 100%. In addition, the repair efficiency calculated according to the elongation at break is 90.6. %. The results show that the sealing composite according to embodiments of the present invention has an excellent self-healing property, great durability, and practical value.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

The invention claimed is:

1. A sealing composite, comprising a molecular formula as follows:

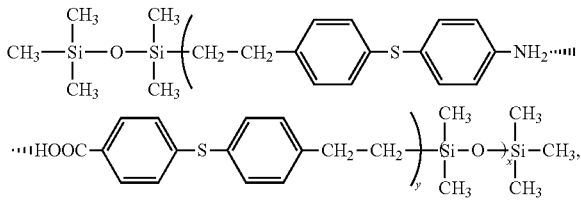

wherein a ratio of x to y ranges from 0.25 to 0.

2. The sealing composite according to claim 1, wherein a connection between a $NH_2$ bond and a HOOC bond in the molecular formula is a hydrogen bond, and the hydrogen bond is a noncovalent bond.

3. The sealing composite according to claim 1, wherein the sealing composite is prepared by a raw material, and the raw material comprises a first polymer and a second polymer, wherein the first polymer has a molecular formula as follows:

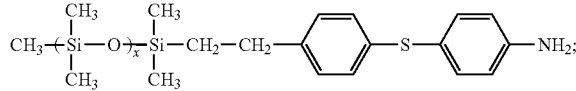

and wherein the second polymer has a molecular formula as follows:

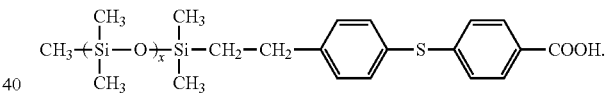

4. The sealing composite according to claim 3, wherein a molar ratio of the first polymer to the second polymer ranges from 0.2 to 5.

5. The sealing composite according to claim 3, wherein the first polymer is prepared by a raw material, and the raw material comprises a compound A and a compound C, and the compound A is p-aminothiophenol and the compound C is vinyl terminated siloxane; wherein the compound A has a molecular formula as follows:

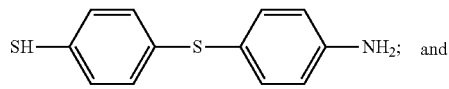 [SMILES: Nc1ccc(Sc2ccc(S)cc2)cc1] and wherein the compound C has a molecular formula as follows:

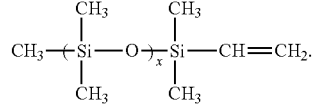

6. The sealing composite according to claim 5, wherein a molar ratio of the compound C to the compound A ranges from 0.25 to 4.

7. The sealing composite according to claim 3, wherein the second polymer is prepared by a raw material, and the raw material comprises a compound B and a compound C, and the compound B is p-mercaptobenzoic acid and the compound C is vinyl terminated siloxane; wherein the compound B has a molecular formula as follows:

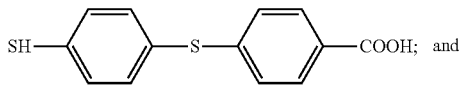 [SMILES: O=C(O)c1ccc(Sc2ccc(S)cc2)cc1]

wherein the compound C has a molecular formula as follows:

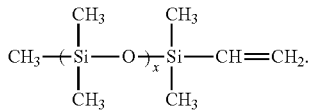

8. The sealing composite according to claim 7, wherein a molar ratio of the compound C to the compound B ranges from 0.25 to 4.

9. A preparation method for the sealing composite of claim 1, comprising following steps:
dissolving a first polymer and a second polymer in tetrahydrofuran to obtain a mixture solution and stirring the mixture solution at 20 to 40° C. for 24 to 96 hours;
drying the mixture solution in a vacuum environment at 40 to 80° C. for 10 to 25 minutes to obtain a remaining mixture solution; and
coating the remaining mixture solution on a glass substrate and drying in a vacuum environment at 40 to 60° C. to obtain the sealing composite;
wherein the sealing composite is prepared by a raw material, and the raw material comprises a first polymer and a second polymer;
wherein the first polymer has a molecular formula as follows:

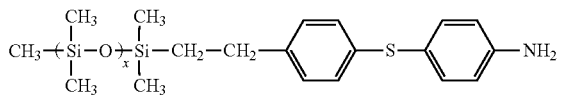

and
wherein the second polymer has a molecular formula as follows:

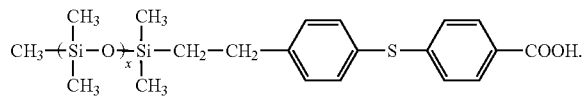

10. A sealing ring comprising the sealing composite of claim 1.

* * * * *